(12) United States Patent
Watanabe et al.

(10) Patent No.: US 7,034,095 B2
(45) Date of Patent: Apr. 25, 2006

(54) BICYCLIC CONJUGATED DIENE POLYMER AND BICYCLIC CONJUGATED DIENE COPOLYMER

(75) Inventors: Saisuke Watanabe, Atsugi (JP); Teppei Tsujimoto, Tokyo (JP); Shuichi Tajima, Tokyo (JP)

(73) Assignee: Nippon Petrochemicals Co., Ltd., Tokyo (JP)

( * ) Notice: Subject to any disclaimer, the term of this patent is extended or adjusted under 35 U.S.C. 154(b) by 68 days.

(21) Appl. No.: 10/504,550

(22) PCT Filed: Feb. 14, 2003

(86) PCT No.: PCT/JP03/01551

§ 371 (c)(1),
(2), (4) Date: Aug. 13, 2004

(87) PCT Pub. No.: WO03/068831

PCT Pub. Date: Aug. 21, 2003

(65) Prior Publication Data

US 2006/0020094 A1    Jan. 26, 2006

(30) Foreign Application Priority Data

Feb. 14, 2002  (JP) .............. 2002-036169
Oct. 20, 2002  (JP) .............. 2002-317962
Nov. 27, 2002  (JP) .............. 2002-343907

(51) Int. Cl.
    *C08F 32/08*       (2006.01)
(52) U.S. Cl. .............. 526/280; 526/75; 526/335; 526/337; 585/22; 585/23
(58) Field of Classification Search .......... 526/280, 526/335, 75, 337; 585/22, 23
    See application file for complete search history.

(56) References Cited

U.S. PATENT DOCUMENTS 3,366,616 A * 1/1968 Tietz ................... 526/280
6,699,950 B1 * 3/2004 Ismeier et al. ........... 526/237

FOREIGN PATENT DOCUMENTS

| JP | 3-139506 A | 6/1991 |
| JP | 3-205408 A | 9/1991 |
| JP | 4-63807 A | 2/1992 |
| JP | 5-262821 A | 10/1993 |
| JP | 7-196737 A | 8/1995 |
| JP | 7-247321 A | 9/1995 |
| JP | 11-35634 A | 2/1999 |
| JP | 11-189614 A | 7/1999 |
| JP | 2000-26581 A | 1/2000 |
| JP | 2000-351885 A | 12/2000 |
| JP | 2001-354726 A | 12/2001 |
| WO | 99/50320 A2 | 10/1999 |

OTHER PUBLICATIONS

McLain, Stephan J. et al. "Addition Polymerization of Cyclopentene with Nickel and Palladium Catalysts," *Macromolecules*, 1998, vol. 31, pp. 6705-6707.

Ouchi, Makoto et al. "Cationic Polymerization of Cyclopentadiene with SnCl$_4$: Control of Molecular Weight and Narrow Molecular Weight Distribution," *Macromolecules*, 2001, vol. 34, pp. 3176-3181.

Nakano, Mitsuru et al. "Stereo- and regiospecific polymerization of cyclic conjugated dienes using highly active nickel catalysts," *Chem. Comm.*, 2000, pp. 2207-2208.

Longo, Pasquale et al. "Highly Stereoregular Polymerization of 1,3-Cyclohexadiene in the Presence of Cp$_2$Ni-MAO Catalyst," *Macromol. Chem. and Phy.*, 2001, vol. 202, pp. 409-412.

Natori, Itaru et al. "Hydrocarbon Polymers Containing Six-Membered Rings in the Main Chain. Microstructure and Properties of Poly (1,3-cyclohexadiene)," *Journal of Polymer Science*, 1998, vol. 36, pp. 1657-1668.

\* cited by examiner

*Primary Examiner*—Fred Teskin
(74) *Attorney, Agent, or Firm*—Kubovcik & Kubovcik

(57) ABSTRACT

A bicyclic conjugated diene polymer obtained by polymerizing a monomer (M) comprising at least one kind of bicyclic conjugated diene monomer represented by formula (I), and a bicyclic conjugated diene copolymer obtained by copolymerizing monomer (M) with at least one kind of unsaturated compound other than said monomer:

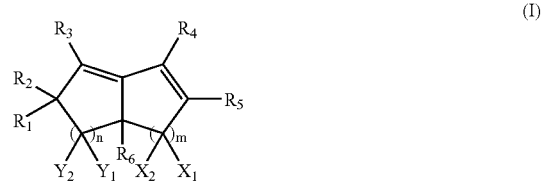

(I)

wherein, $R_1$ to $R_6$ are the same or different and are each hydrogen, halogen, or alkyl or halogenated alkyl of 1 to 20 carbon; n and m are each an integer of from 0 to 10; $X_1$, $X_2$, $Y_1$ and $Y_2$ are the same or different from each other and are each hydrogen, halogen or alkyl or halogenated alkyl of 1 to 20 carbon; and, when m or n is 2 or more, each of $mX_1$'s, $mX_2$'s, $nY_1$'s and $nY_2$'s are the same or different.

15 Claims, 15 Drawing Sheets

BICYCLIC CONJUGATED DIENE POLYMER AND BICYCLIC CONJUGATED DIENE COPOLYMER

TECHNICAL FIELD

The present invention relates to a cyclic conjugated diene polymer and a cyclic conjugated diene copolymer, particularly to a bicyclic conjugated diene polymer and a bicyclic conjugated diene copolymer.

BACKGROUND ART

In recent years, polymers having a main chain of cyclic hydrocarbon skeleton are drawing attention as a polymer material which is superior in heat resistance and mechanical strengths owing to the rigid structure and further superior in optical properties, electrical properties, etc. Such polymers are classified into two groups from the main chain structures which affect the properties. The first group is norbornene type compound metathesis polymers (see, for example, the third chapter of "Synthesis of Polymers" by R. H. Grubbs, published from Wiley VCH in 1999). These polymers have a structural feature of having spacer moieties of chain skeleton between units of bulky cyclic skeleton. The second group is polymers constituted by a cyclic skeleton alone and having no spacer moiety. They are, for example, a norbornene type compound vinylene-type polymer (see, for example, JP-A-3205408, JP-4-63807 and JP-A-5-262821); a cyclopentene polymer (see, for example, JP-A-3-139506, WO 99/50320, and "Macromolecules" 1998, 31, 6705); a cyclopentadiene polymer (see, for example, "Macromolecules" 2001, 34, 3176); and a 1,3-cyclohexadiene polymer (see, for example, JP-A-7-247321, JP-A2000-26581 and JP-A-2000-351885). However, polymers which are sufficient in practical performances of solubility in solvents, heat resistance, mechanical strengths and the like have not been developed yet.

Of these polymers, the 1,3-cyclohexadine polymer has a high glass transition temperature of 170° C. and a high solubility in solvents and is hopeful as a next-generation resin. However, the polymer has a rigid cis structure and is bulky three-dimensionally, and accordingly the polymerization process for production thereof is limited. Recently, there have been developed polymerization processes such as anionic polymerization using a butyl lithium/tetramethylethylenediamine catalyst (see, for example, JP-A-7247321), nickel catalyst coordination polymerization (see, for example, JP-A2000-26581, JP-A-2000-351885, and "Chemical Communications" 2000, 22072208), and the like; however, the catalysts used therein are still limited. Further, 1,3-cyclohexadiene per se is difficult to produce industrially. For example, dehydrogenation of cyclohexene (see, for example, JP-A-7-196737) is inferior in conversion and selectivity and has a difficulty in separation of byproducts; further, it has a detrimental drawback in that there is by-produced 1,4-cyclohexadiene which impairs polymerization of 1,3-cyclohexadiene. There is also a process for producing 1,3-cyclohexadiene via cyclohexene chloride (see, for example, JP-A-11-189614); however, this process employs several steps and moreover gives a low yield and, therefore, is far from satisfaction industrially.

Hence, the first object of the present invention is to provide a cyclic diene polymer which is produced from a cyclic conjugated diene monomer easy to produce and high in polymerization activity, additionally has high heat resistance and high mechanical strengths and shows good solubility in solvents.

Olefins having a cyclic hydrocarbon skeleton are used as a raw material for the above-mentioned polymers of high performances. By using, in particular, a cyclic diolefin, the polymer obtained can be imparted with further functions. For example, a cyclic non-conjugated diolefin such as dicyclopentadiene, vinylnorbornene, ethylidenenorbornene or the like has two kinds of unsaturated bonds of different reactivity; therefore, polymerization is possible with one unsaturated bond and functions can be imparted with the other unsaturated bond. In the case of, for example, ethylidenenorbornene which is widely used industrially as the third component of ethylene/propylene/diene rubber (EPDM) [see, for example, pp. 120 to 122 of "Basis of Rubber Technology (New Edition)" published from The Society of Rubber Industry, Japan on 2002, and pp. 130 to 139 of "Handbook of Rubber Industry (New Edition)" published from The Society of Rubber Industry, Japan on 1994], it is considered that the unsaturated bond of norbornene ring reacts during copolymerization and the unsaturated bond of ethylidene group reacts during vulcanization of rubber. When a difference in reactivity between two kinds of unsaturated bonds is utilized, however, with the result that the difference is not sufficiently large, the two unsaturated bonds may react during polymerization to form a three-dimensional crosslink, which may cause gelling.

Meanwhile, a conjugated diene compound is characterized in that the polymer obtained therefrom contains remaining unsaturated bonds always. The remaining unsaturated bonds are utilized for secondary reaction such as crosslinking, vulcanization or the like, or for imparting functions by chemical conversion such as hydrogenation, epoxidization, halogenation, arylation, hydration, carbonylation or the like.

Of various conjugated diene compounds, compounds having a cyclic hydrocarbon skeleton, i.e. cyclic conjugated dienes are expected as a very useful compound; however, examples of such cyclic conjugated dienes are very few and only 1,3-cyclohexadiene or so is mentioned (see Macromolecular Chemistry and Physics, U.S., 2001, 202, pp. 409 to 412, and Journal of Polymer Science: Part B: Polymer Physics, U.S., 1998, Vol. 36, pp. 1657 to 1668). Moreover, as mentioned above, the 1,3-cyclohexadiene per se is difficult to produce industrially.

Thus, there is strongly desired, for its industrial usefulness, a copolymer which is obtained by copolymerization of a cyclic conjugated diene of high polymerizability and easy production with other unsaturated compound.

Hence, the second object of the present invention is to provide a cyclic diene copolymer obtained by copolymerization of a cyclic conjugated diene monomer of easy production and high polymerization activity, with an unsaturated compound.

DISCLOSURE OF THE INVENTION

The present inventors had made strenuous efforts in order to solve the above problems. As a result, the present inventors found that a bicyclic conjugated diene monomer easily obtained by isomerization of a bicyclic non-conjugated diene has high reactivity and gives a bicyclic conjugated diene polymer having a structure which had not heretofore been reported, additionally a high glass transition temperature and further that copolymerization of the above bicyclic conjugated diene monomer with other unsaturated compound provides a bicyclic conjugated diene copolymer having a structure which had not heretofore been reported. This finding has led to the completion of the present invention.

The first aspect of the present invention lies in the followings:

[1] A bicyclic conjugated diene polymer obtained by polymerizing a monomer comprising at least one kind of bicyclic conjugated diene monomer represented by the following general formula (I):

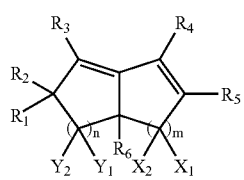

wherein in the above general formula (I), $R_1$, $R_2$, $R_3$, $R_4$, $R_5$ and $R_6$ may be the same or different from each other and are each a hydrogen atom, a halogen atom, or an alkyl or halogenated alkyl group of 1 to 20 carbon atoms; n and m are each an integer of from 0 to 10; $X_1$, $X_2$, $Y_1$ and $Y_2$ may be the same or different from each other and are each a hydrogen atom, a halogen atom, or an alkyl or halogenated alkyl group of 1 to 20 carbon atoms; and, when m or n is 2 or more, each of $mX_1$'s, $mX_2$'s, $nY_1$'s and $nY_2$'s may be the same or different from each other.

[2] A bicyclic conjugated diene polymer according to the above [1], wherein the bicyclic conjugated diene monomer comprises bicyclo[4.3.0]-2,9-nonadiene, i.e. a compound of the general formula (I) in which $R_1=R_2=R_3=R_4=R_5=R_6=H$, n=2, m=1, and $X_1=X_2=Y_1=Y_2=H$.

[3] A bicyclic conjugated diene polymer according to the above [1], wherein the bicyclic conjugated diene monomer comprises bicyclo[4.3.0]-2,9-nonadiene, i.e. a compound of the general formula (I) in which $R_1=R_2=R_3=R_4=R_5=R_6=H$, n=2, m=1, and $X_1=X_2=Y_1=Y_2=H$ and bicyclo[4.3.0]-1,8-nonadiene, i.e. a compound of the general formula (I) in which $R_1=R_2=R_3=R_4=R_5=R_6=H$, n=1, m=2, and $X_1=X_2=Y_1=Y_2=H$.

[4] A bicyclic conjugated diene polymer according to the above [2] or [3], wherein the bicyclic conjugated diene monomer is a part or the whole of the isomerization products of bicyclo-[4.3.0]-3,7-nonadiene.

[5] A bicyclic conjugated diene polymer according to the above [1], wherein the bicyclic conjugated diene monomer comprises bicyclo[4.3.0]-3-methyl-2,9-nonadiene, i.e. a compound of the general formula (I) in which $R_1=R_2=R_3=R_4=R_6=H$, $R_5=CH_3$, n=1, m=2, and $X_1=X_2=Y_1=Y_2=H$.

[6] A bicyclic conjugated diene polymer according to the above [1], wherein the bicyclic conjugated diene monomer comprises bicyclo[4.3.0]-3-methyl-2,9-nonadiene and bicyclo[4.3.0]-3-methyl-1,3-nonadiene, which are compounds of the general formula (I) in which $R_1=R_2=R_3=R_4=R_6=H$, $R_5=CH_3$, n=1, m=2, and $X_1=X_2=Y_1=Y_2=H$.

[7] A bicyclic conjugated diene polymer according to the above [5] or [6], wherein the bicyclic conjugated diene monomer is a part or the whole of the isomerization products of bicyclo-[4.3.0]-3-methyl-3,7-nonadiene.

[8] A modified bicyclic conjugated diene polymer obtained by chemical conversion of a bicyclic conjugated diene polymer set forth in any of the above [2] to [7].

The second aspect of the present invention lies in the followings.

[1] A bicyclic conjugated diene copolymer obtained by copolymerizing a monomer comprising at least one kind of bicyclic conjugated diene monomer represented by the following general formula (I), with at least one kind of unsaturated compound other than said monomer:

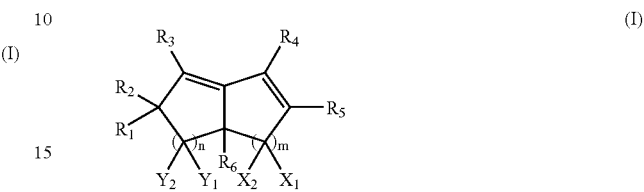

wherein in the above general formula (I), $R_1$, $R_2$, $R_3$, $R_4$, $R_5$ and $R_6$ may be the same or different from each other and are each a hydrogen atom, a halogen atom, or an alkyl or halogenated alkyl group of 1 to 20 carbon atoms; n and m are each an integer of from 0 to 10; $X_1$, $X_2$, $Y_1$ and $Y_2$ may be the same or different from each other and are each a hydrogen atom, a halogen atom, or an alkyl or halogenated alkyl group of 1 to 20 carbon atoms; and, when m or n is 2 or more, each of $mX_1$'s, $mX_2$'s, $nY_1$'s and $nY_2$'s may be the same or different from each other.

[2] A bicyclic conjugated diene copolymer according to the above [1], wherein the bicyclic conjugated diene monomer comprises bicyclo[4.3.0]-2,9-nonadiene, i.e. a compound of the general formula (I) in which $R_1=R_2=R_3=R_4=R_5=R_6=H$, n=2, m=1, and $X_1=X_2=Y_1=Y_2=H$.

[3] A bicyclic conjugated diene copolymer according to the above [1], wherein the bicyclic conjugated diene monomer comprises bicyclo[4.3.0]-2,9-nonadiene, i.e. a compound of the general formula (I) in which $R_1=R_2=R_3=R_4=R_5=R_6=H$, n=2, m=1, and $X_1=X_2=Y_1=Y_2=H$ and bicyclo[4.3.0]-1,8-nonadiene, i.e. a compound of the general formula (I) in which $R_1=R_2=R_3=R_4=R_5=R_6=H$, n=1, m=2, and $X_1=X_2=Y_1=Y_2=H$.

[4] A bicyclic conjugated diene copolymer according to the above [2] or [3], wherein the bicyclic conjugated diene monomer is a part or the whole of the isomerization products of bicyclo-[4.3.0]-3,7-nonadiene.

[5] A bicyclic conjugated diene copolymer according to any of the above [1] to [4], wherein the unsaturated compound is at least one kind selected from olefins and diolefins all of 2 to 10 carbon atoms.

[6] A bicyclic conjugated diene copolymer according to any of the above [1] to [5], wherein the unsaturated compound is at least one kind selected from butadiene, isoprene, piperylene, chloroprene, acrylonitrile, ethylene, propylene, isobutene and styrene.

[7] A modified bicyclic conjugated diene copolymer obtained by chemical conversion of a bicyclic conjugated diene copolymer set forth in any of the above [1] to [6].

BEST MODE FOR CARRYING OUT THE INVENTION

Figure 1:
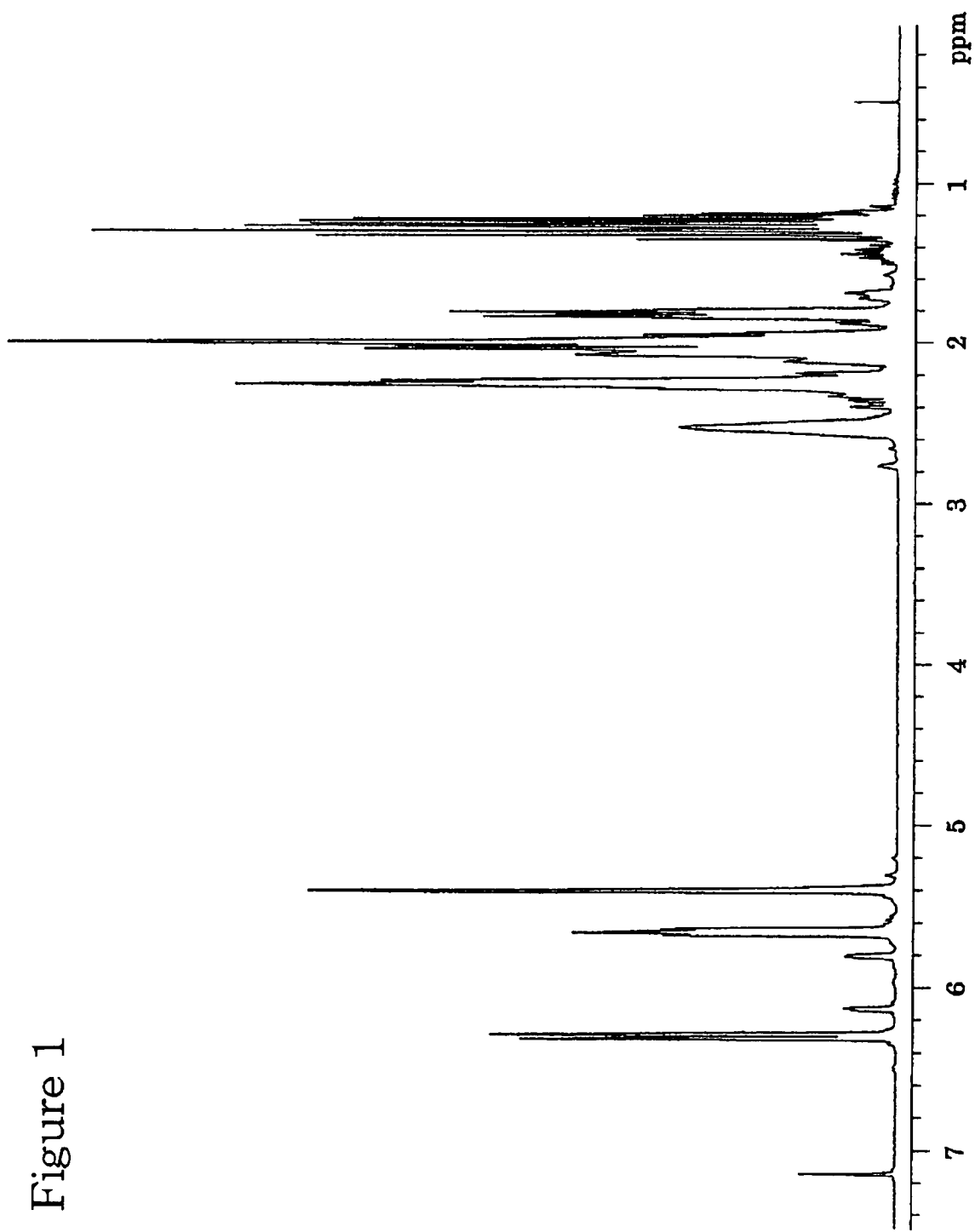
FIG. 1 is a $^1$HNMR (400 MHz) chart of the monomers mixture obtained in Production Example 1.

Hereinafter, explanation is made in detail on the bicyclic conjugated diene polymer according to the first aspect of the present invention.

The bicyclic conjugated diene polymer of the present invention is a polymer comprising, as the structural unit, a bicyclic conjugated diene monomer of the general formula (I), and the structure of the polymer is not restricted. As the bonding form of the polymer of the present invention, there can be mentioned, for example, a bond between (n+4)-membered ring and (m+4)-membered ring, a bond between (m+4)-membered ring and (m+4)-membered ring, and a bond between (n+4)-membered ring and (n+4)-membered ring, in the bicyclic conjugated diene monomer. When the bicyclic conjugated diene monomer comprises, for example, bicyclo[4.3.0]-3-methyl-2,9-nonadiene and bicyclo[4.3.0]-3-methyl-1,3-nonadiene, which are compounds of the general formula (I) wherein $R_1=R_2=R_3=R_4=R_6=H$, $R_5=CH_3$, n=1, m=2, and $X_1=X_2=Y_1=Y_2=H$, there may also be included a bond between the 5- or 6-membered ring of bicyclo[4.3.0]-3-methyl-2,9-nonadiene and the 6-membered ring of bicyclo[4.3.0]-3-methyl-1,3-nonadiene. These bonding forms may be present at random or all of them may be present. In production of the bicyclic conjugated diene polymer of the present invention, as in production of a butadiene polymer, there are formed either or both of the 1,4-bond and 1,2-bond of the bicyclic conjugated diene monomer of the general formula (I). Incidentally, when the 1,4-bond is formed, it can have a cis structure and a trans structure.

In production of the bicyclic conjugated diene polymer of the present invention, there is usually obtained a polymer having a weight-average molecular weight of about 500 to 100,000. Depending upon the application, however, there can preferably be used a polymer of about 1,000 or more, further about 10,000 or more. There is usually obtained a polymer having a glass transition temperature of up to about 170° C., and there is usually used a polymer of about 90° C. or more and, depending upon the application, there is preferably used a polymer of about 130° C. or more, further about 150° C. or more.

As the bicyclic conjugated diene monomer of the present invention represented by the general formula (I), i.e. the conjugated diene having a bicyclo[2+n.2+m.0] skeleton, there can be mentioned, for example, bicyclo[4.4.0]-1,9-decadiene, bicyclo[4.3.0]-2,9-nonadiene, bicyclo[4.3.0]-1,8-nonadiene, bicyclo[3.3.0]-1,7-octadiene, bicyclo[4.3.0]-X-methyl-2,9-nonadiene (X is any integer of 2 to 9) and bicyclo[4.3.0]-X-methyl-1,3-nonadiene (X is any integer of 2 to 9). Bicyclo[4.3.0]-2,9-nonadiene, bicyclo[4.3.0]-1,8-nonadiene, bicyclo[4.3.0]-3-methyl-2,9-nonadiene and bicyclo[4.3.0]-3-methyl-1,3-nonadiene are preferred; and bicyclo[4.3.0]-2,9-nonadiene is more preferred. These compounds can be used singly or in combination of two or more kinds. Incidentally, bicyclo[4.3.0]-2,9-nonadiene can easily be obtained by isomerization of bicyclo[4.3.0]-3,7-nonadiene (which is being mass-produced industrially) using a dichlorotitanocene/lithium aluminum hydride catalyst (Tetrahedron Letters 1980, Vol. 21, pp. 637-640). Similarly, bicyclo[4.3.0]-1,8-nonadiene is obtained by isomerization of bicyclo[4.3.0]-3,7-nonadiene; and bicyclo[4.3.0]-X-methyl-2,9-nonadiene and bicyclo[4.3.0]-X-methyl-1,3-nonadiene are obtained by isomerization of bicyclo[4.3.0]-X-methyl-3,7-nonadiene (X is any integer of 2 to 9) and/or bicyclo[4.3.0]-X-methyl-3,8-nonadiene (X is any integer of 2 to 9). The isomerization products of bicyclo[4.3.0]-3,7-nonadiene comprise bicyclo [4.3.0]-2,9-nonadiene, bicyclo [4.3.0]-1,8-nonadiene, etc.; and a part or the whole (one or a plurality of compounds) of the isomerization products can be used as the monomer in the present invention. Further, the isomerization products of bicyclo[4.3.0]-3-methyl-3,7-nonadiene and/or bicyclo[4.3.0]-3-methyl-3,8-nonadiene comprise bicyclo [4.3.0]-3-methyl-2,9-nonadiene, bicyclo [4.3.0]-3-methyl-1,3-nonadiene, etc.; and a part or the whole (one or a plurality of compounds) of the isomerization products can be used as the monomer in the present invention.

With respect to the production process of the bicyclic conjugated diene polymer of the present invention, there is no particular restriction. The polymer can be produced by cationic polymerization, anionic polymerization, radical polymerization, coordination polymerization, etc., as in polymerization of a chain conjugated diene monomer such as butadiene or the like. The catalyst or reaction initiator used in these polymerizations can be the same as used in polymerization of a chain conjugated diene monomer such as butadiene or the like.

The above polymerization may be conducted in water in an emulsified state using a surfactant such as potassium or sodium salt of disproportionated rosin acid, formaldehyde condensate of naphthalenesulfonic acid or its potassium or sodium salt, sodium formaldehyde sulfoxylate, or the like.

With respect to the catalyst used in cationic polymerization, there is no particular restriction. There can be used, for example, Lewis acids such as aluminum chloride, iron chloride, tin chloride, zinc chloride, strontium chloride, scandium chloride, titanium tetrachloride, trifluoroborate, trifluoroborate ether complex, trifluoroborate methanol complex, trifluoroborate phenol complex, trispentafluoroborate and the like; protonic acids such as sulfuric acid, p-toluenesulfonic acid, hydrochloric acid, nitric acid and the like; alkyl aluminum chloride; and activated clay.

With respect to the catalyst used in anionic polymerization, there is no particular restriction. There can be used, for example, alkyl lithiums such as n-butyl lithium, sec-butyl lithium, tert-butyl lithium and the like; alkyl lithium/tetramethylethylenediamine mixtures; alkyl sodiums such as sodium methoxide and the like; alkyl potassiums such as cumyl potassium and the like; sodium naphthalene; distyryl dianion; metallic potassium; metallic sodium; and metallic lithium.

With respect to the initiator used in radical polymerization, there is no particular restriction. There can be used, for example, dialkyl peroxides such as ditertiary butyl peroxide and the like; diacyl peroxides such as benzoyl peroxide and the like; azo compounds such as azobisisobutyronitrile and the like; disulfide compounds such as tetra-alkyl thiuram disulfide and the like; and redox initiators such as hydrogen peroxide/iron salt type, benzoyl peroxide/dimethylaniline type, tetra-valent cerium salt/alcohol type and the like. By using such a radical initiator and, as necessary, by applying a heat or a light, a radical is generated.

With respect to the catalyst used in coordination polymerization, there is no particular restriction. There can be used, for example, tetrachlorotitanium/triisobutyl aluminum, tetrachlorotitanium/triethyl aluminum, dichlorocobalt/diethyl aluminum chloride, trichlorovanadium/triethyl aluminum, tetrachlorovanadium/triethyl aluminum, and trisacetylacetonate vanadium/triethyl aluminum.

With respect to the solvents used in these polymerizations, there is no particular restriction, and an ordinary solvent can be used. There can be mentioned, for example, halogenated hydrocarbon type solvents such as chloromethane, dichloromethane, trichloromethane, tetrachloromethane, dichloroethane, trichloroethane, tetrachloroethane, tetrachloroethylene and the like; aromatic hydrocarbons type solvents such as toluene, benzene, xylene, ethylbenzene and the like; aliphatic hydrocarbon type solvents such as cyclohexane, mehtylcyclohexane, pentane, hexane, heptane and the like; and polar solvents such as acetone, dimethylformamide, tetrahydrofuran, methyl ethyl ketone, ethyl acetate, acetonitrile, diethyl ether, N-methylpyrrolidone and the like. These solvents can be used singly or in combination of two or more kinds. Polymerization may be conducted without using any solvent.

The polymerization is conducted desirably between −150° C. and 150° C., preferably between −100° C. and 100° C., more preferably −60° C. and 60° C. The polymerization temperature differs depending upon the type of polymerization. There is no particular restriction as to the polymerization time, but it is preferred to conduct polymerization within 24 hours.

The reaction mixture containing the thus-obtained polymer(s) can be subjected to a purification treatment by an ordinary method. When, for example, reprecipitation is conducted, the reaction mixture is dissolved in an appropriate good solvent (e.g. toluene or tetrahydrofuran) and the resulting solution is poured into an appropriate poor solvent (e.g. methanol, isopropyl alcohol, acetone or water), whereby the polymer(s) can be precipitated. The resulting precipitate is filtered to separate it from the solvent and then dried by heating under reduced pressure, whereby a polymer(s) can be obtained.

It is possible to subject the double bonds remaining in the polymer(s), to a chemical conversion such as hydrogenation, epoxidization, arylation, vulcanization or the like to obtain a modified bicyclic conjugated diene polymer(s).

Next, detailed explanation is made on the bicyclic conjugated diene copolymer according to the second aspect of the present invention. The bicyclic conjugated diene copolymer according to the second aspect of the present invention has, as the structural units, the above-mentioned bicyclic conjugated diene monomer of the general formula (I) and other unsaturated compound.

There is no particular restriction as to the unsaturated compound used in the present invention. As the compound, there can be selected at least one compound preferably from olefins and diolefins of 2 to 10 carbon atoms. As such olefins and diolefins, there can be mentioned, for example, straight chain or branched chain olefins such as ethylene, propylene, butene, isobutene, pentene, hexene and the like; cyclic olefins such as cyclobutene, cyclopentene, cyclohexene, vinylcyclohexane, tetracyclododecene, norbornene or its derivatives, and the like; aromatic olefins such as styrene, vinyltoluene, indene, divinylbenzene and the like; alicyclic diolefins such as dicyclopentadiene, tetrahydroindene, methyltetrahydroindene, vinylcyclohexene, vinylnorbornene, ethylidenenorbornene, cyclooctadiene, limonene and the like; conjugated dienes such as butadiene, isoprene, piperylene, chloroprene, cyclopentadiene, 1,3-cyclohexadiene and the like; acrylonitrile; acrylic acid and its esters; methacrylic acid and its esters; and heteroolefins such as maleic anhydride, acrylamide, vinyl alcohol, vinyl acetate and the like. It is particularly preferably to select from butadiene, isoprene, pierylene, chloroprene, acrylonitrile, propylene, isobutene and styrene.

With respect to the bicyclic conjugated diene copolymer according to the second aspect of the present invention, the polymerization process, the catalyst used in cationic polymerization, the catalyst used in anionic polymerization, the initiator used in radical polymerization, the catalyst used in coordination polymerization, the solvent used in such polymerization, the temperature of polymerization, the time of polymerization, the treatment for purification, etc. are the same as those employed in production of the bicyclic conjugated diene polymer according to the first aspect of the present invention.

As in the case of the bicyclic conjugated diene polymer according to the first aspect of the present invention, it is possible to subject the double bonds remaining in the obtained polymer(s), to a chemical conversion such as hydrogenation, epoxidization, arylation, vulcanization or the like to obtain a modified bicyclic conjugated diene copolymer.

There is no particular restriction as to the structure of the bicyclic conjugated diene copolymer according to the second aspect of the present invention. The bicyclic conjugated diene copolymer according to the second aspect of the present invention may have either of a straight chain structure, a branched chain structure and a cyclic structure. The polymerization type may be any of block polymerization, random polymerization and alternating copolymerization, and they may be mixed.

The bonding form in the bicyclic conjugated diene monomer of the general formula (I) in the second aspect of the present invention may be the same bonding form as seen in polymerization of butadiene, that is, either or both of 1,4-bond and 1,2-bond. When the bonding form is the same as 1,4-bond, a trans structure or a cis structure is formed depending upon the structure of the bicyclic conjugated diene monomer used. Irrespective of the kind of the bonding form, the cyclic skeleton of bicyclic conjugated diene monomer after polymerization is characterized by having a 3-substituted unsaturated bond and possessing a planar structure (two-dimensional structure). Therefore, three-dimensional crosslinking is unlikely to take place, there hardly occurs entanglement between molecular chains of olefins in copolymer, and gelling is suppressed.

In the second aspect of the present invention, when the bicyclic conjugated diene monomers of the general formula (I) bond with each other, there may take place bonding between (n+4)-membered ring and (m+4)-membered ring, bonding between (m+4)-membered ring and (m+4)-membered ring, and bonding between (n+4)-membered ring and (n+4)-membered ring.

EXAMPLES

The present invention is described specifically below by Production Examples and Examples. However, the present invention is not restricted to these Examples. The following measuring apparatuses were used in the Production Examples and the Examples. Number-average molecular weight (Mn) and weight-average molecular weight (Mw) of polymer were measured using GPC (Gel Permeation Chromatography) produced by Shimadzu Corporation. As the column, there were used TSK Guard Column HXL-L, TSK Gel G 5000 HXL, TSK Gel G 4000 HXL, TSK Gel G 3000 HXL and TSK Gel G 2000 HXL, all produced by Tosoh Corporation. The eluting solvent was tetrahydrofuran; the temperature was 40° C.; and the flow rate was 1.0 ml/min. $^1$HNMR (400 MHz) and $^{13}$CNMR (100 MHz) were measured using Lambda 400 produced by Japan Electron Optical laboratory. Purity of organic compound was measured using GC-17 A (gas chromatography) produced by Shimadzu Corporation. As the column, TC-1 produced by Shimadzu Corporation was used; and the measuring conditions were 60° C. to 90° C. and 1° C./min (temperature elevation rate). Glass transition temperature (Tg) of polymer was measured using DCS 220 C produced by Seiko Denshi Kogyo K.K. The measuring conditions were 70° C. to 250° C. and 20° C./min (temperature elevation rate). The ratio of bicyclo[4.3.0]-2,9-nonadiene and bicyclo[4.3.0]-1,8-nonadiene was measured using HP 6850 A (gas chromatography) produced by Hewlett-Packard Co. As the column, HP-INNOWax produced by Hewlett-Packard Co. was used. With respect to the measuring conditions, a sample was kept at 35° C. for 5 minutes; then, temperature elevation was made to 135° C. at a rate of 5° C./min and further to 250° C. at a rate of 10° C./min.

Monomer Production Example 1

Figure 2:
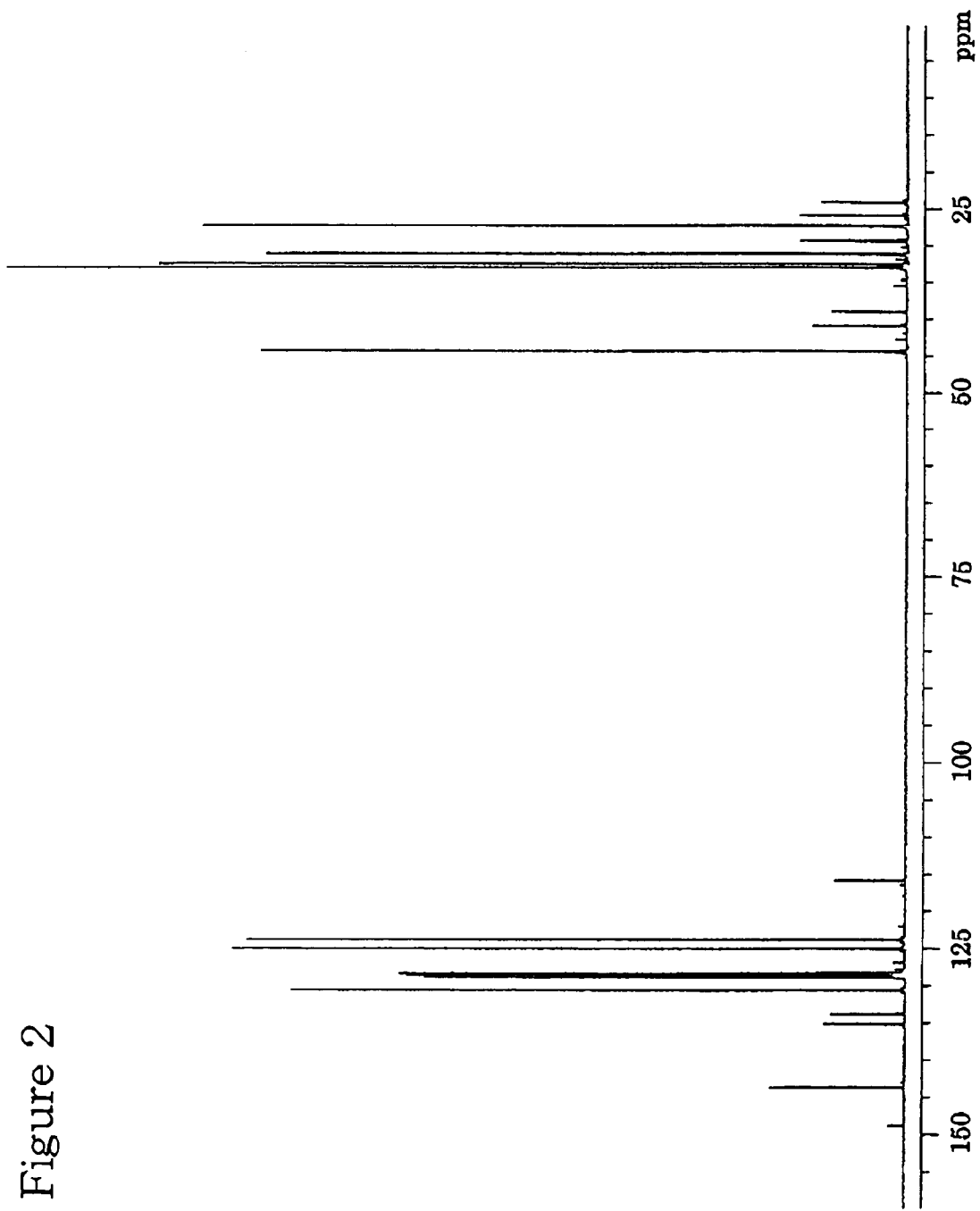
FIG. 2 is a $^{13}$CNMR (100 MHz) chart of the monomers mixture obtained in Production Example 1.

Bicyclo[4.3.0]-2,9-nonadiene and bicyclo[4.3.0]-1,8-nonadiene (each being a bicyclic conjugated diene monomer) were synthesized as follows with reference to Tetrahedron Letters 1980, Vol. 21, 63, 7–640. Into a flask purged with nitrogen were fed 97.4 g (0.81 mol) of bicyclo[4.3.0]-3,7-nonadiene, 825 mg (3.3 mmol) of dichlorotitanocene and 500 mg (13.2 mmol) of lithium aluminum hydride. Gradual temperature elevation was made with stirring until the flask-inside temperature reached 160° C. After the flask contents became a purple suspension, further 200 ml [177.1 g (1.47 mol)] of bicyclo[4.3.0]-3,7-nonadiene was added dropwise and stirring was made for 6 hours with the flask-inside temperature being kept at 160° C. The same procedure was repeated three times to obtain 850 ml of a reaction mixture. To the reaction mixture was added 200 ml of SAS 296 (a diarylalkane) produced by Nippon Petrochemicals Co., Ltd. Then, flash distillation was conducted at 665 Pa (5 mmHg) at 42 to 47° C. (top) to obtain 700 ml of a light yellow transparent liquid. To the liquid was added 400 ml of SAS 296, after which precision fractional distillation was conducted (length of column: 70 cm, column packing: Helipack No. 3 (430 ml), pressure: 532 Pa (4 mmHg), oil bath temperature: 75 to 80° C., reflux ratio=20/1) to obtain 300 g of a colorless transparent liquid. The liquid had a purity of 99% or more when measured by gas chromatography and was found by $^1$HNMR to be a 87/13 mixture of bicyclo[4.3.0]-2,9-nonadiene and bicyclo[4.3.0]-1,8-nonadiene (this mixture is hereinafter referred to as conjugated tetrahydroindene). The $^1$HNMR chart and $^{13}$CNMR chart of the conjugated tetrahydroindene are shown in FIG. 1 and FIG. 2, respectively.

Monomer Production Example 2

Figure 3:
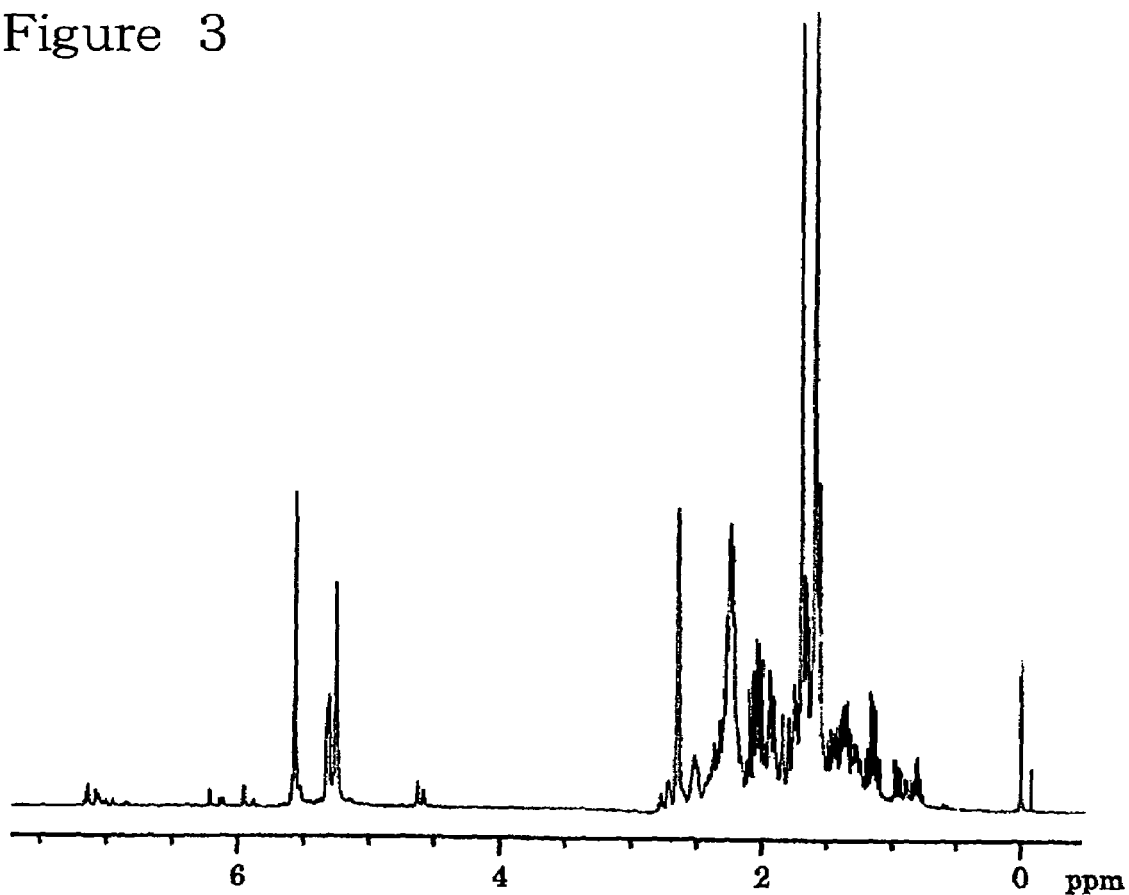
FIG. 3 is a ¹HNMR (400 MHz) chart of the monomers mixture obtained in Production Example 2.
Figure 4:
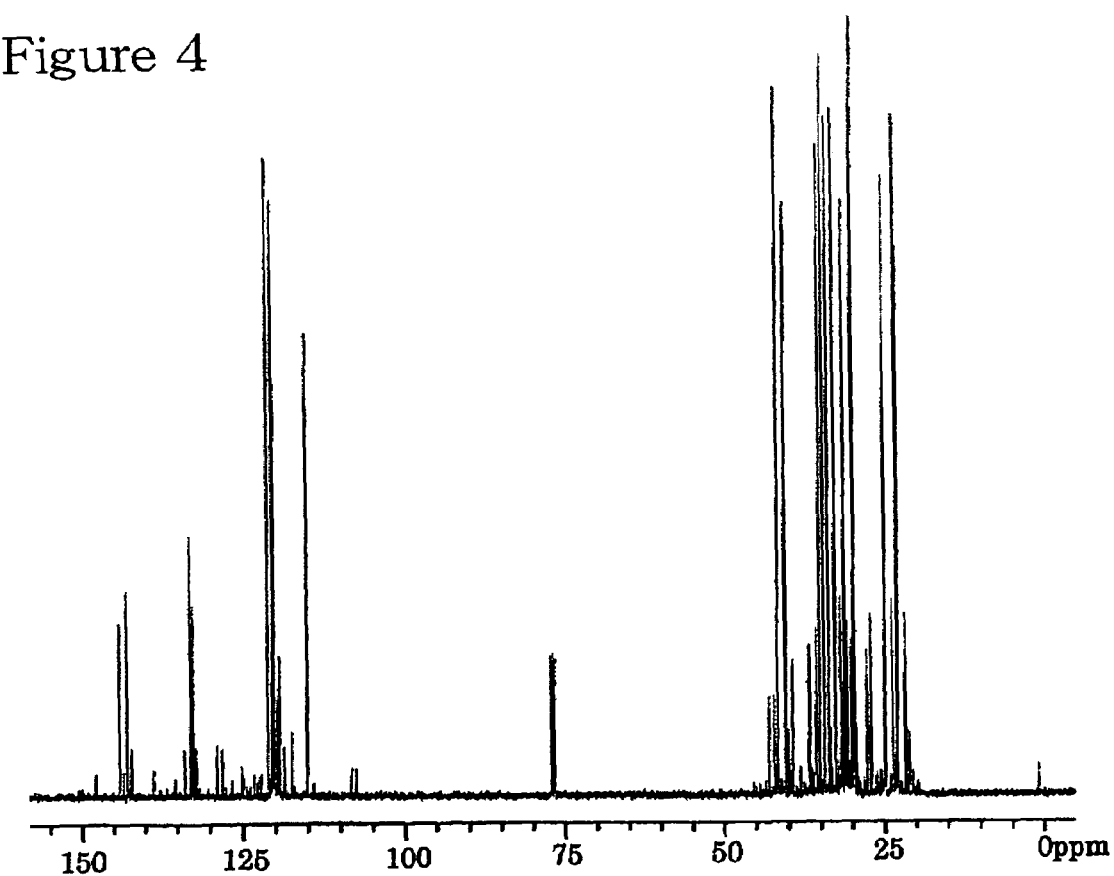
FIG. 4 is a ¹³CNMR (100 MHz) chart of the monomers mixture obtained in Production Example 2.

Bicyclo[4.3.0]-3-methyl-2,9-nonadiene and bicyclo[4.3.0]-3-methyl-1,3-nonadiene (each being a bicyclic conjugated diene monomer) were synthesized as follows. Into a flask purged with nitrogen were fed 28.7 g (0.21 mol) of a mixture (about 90/10) of bicyclo[4.3.0]-3-methyl-3,7-nonadiene and bicyclo[4.3.0]-3-methyl-3,8-nonadiene and 200 mg (0.8 mmol) of dichlorotitanocene. Gradual temperature elevation was made with stirring until the flask-inside temperature reached 130° C. Then, 12 ml (12 mmol) of a 1.0 M lithium aluminum hydride tetrahydrofuran solution was added in small portions using a dropping funnel, in order to prevent the excessive increase of flask-inside temperature. After the flask contents became a purple suspension, stirring was made for 12 hours with the flask-inside temperature being kept at 130° C. After the temperature was decreased to room temperature, 1 ml of methanol was added, and the reaction mixture was filtered through a filter paper. The filtrate was subjected to distillation under reduced pressure to remove the solvent, whereby a light yellow transparent liquid was obtained. The liquid was analyzed by gas chromatography and was found to be a mixture of 41% of bicyclo[4.3.0]-3-methyl-2,9-nonadiene and 33% of bicyclo[4.3.0]-3-methyl-1,3-nonadiene (this mixture is hereinafter referred to as conjugated methyltetrahydroindene). The $^1$HNMR chart and $^{13}$CNMR chart of the conjugated methyltetrahydroindene are shown in FIG. 3 and FIG. 4, respectively.

The following Examples 1 to 5 are each a synthesis example of bicyclic conjugated diene polymer by cationic polymerization.

Example 1

Into a flask purged with nitrogen were fed 25 ml of methylene chloride and 5 ml of the conjugated tetrahydroindene obtained in the above Production Example 1. Stirring was made with the flask-inside temperature being kept at 0° C. Into the system was dropwise added 0.25 ml of a solution of 0.1 ml of BF$_3$-ether complex (BF$_3$ content: 47%) dissolved in 10 ml of methylene chloride, followed by stirring for 20 minutes. 50 ml of toluene was added to make a uniform solution. The solution was poured into 350 ml of methanol. The resulting white solid was recovered by filtration under reduced pressure and vacuum-dried at 130° C. to obtain 3.5 g of a white solid. The solid had good solubility in toluene and, when measured for molecular weight by GPC, gave a weight-average molecular weight (Mw) of 16,700 and a number-average molecular weight (Mn) of 5,400. Also, the solid showed a Tg of 155° C.

Example 2

Figure 5:
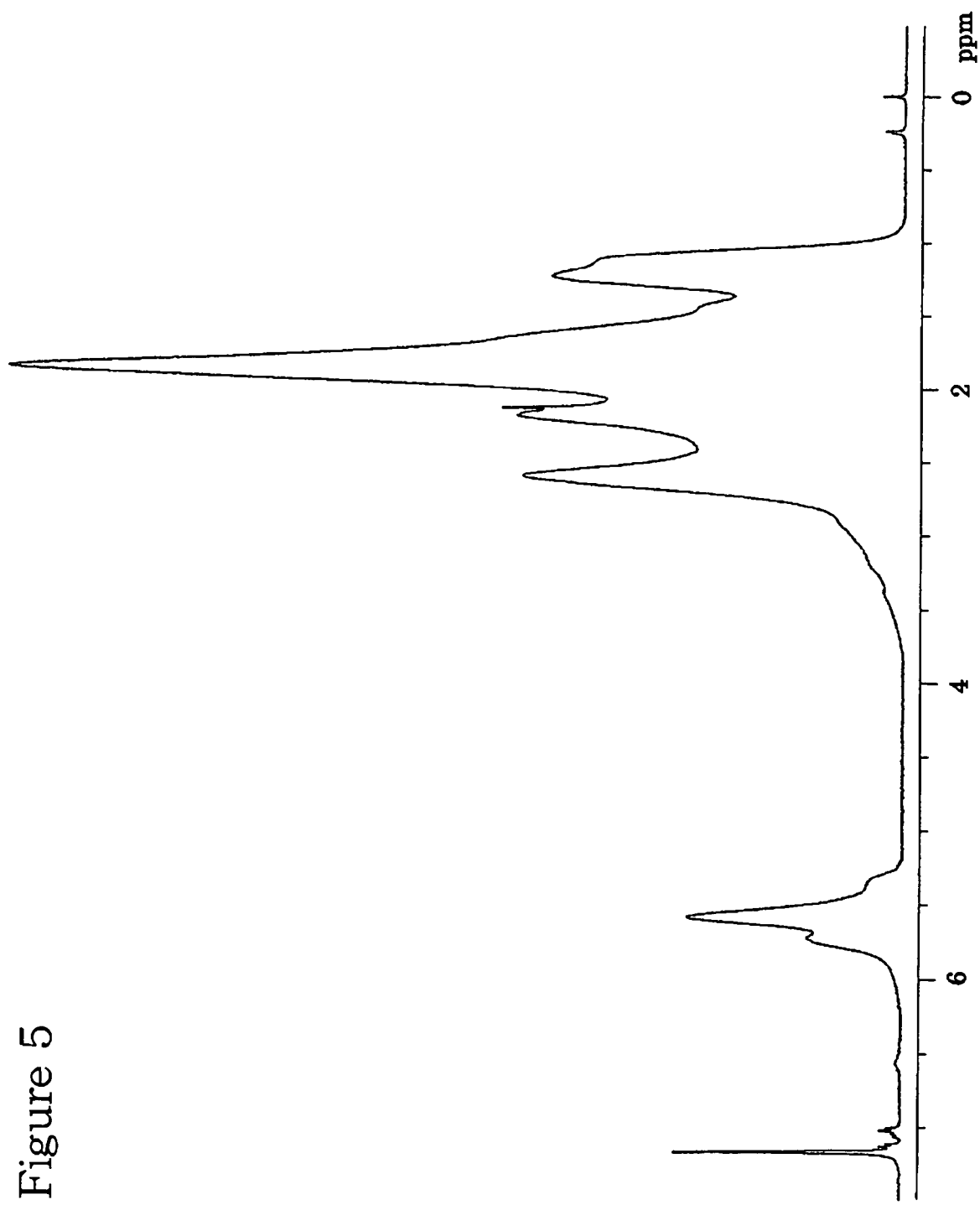
FIG. 5 is a ¹HNMR (400 MHz) chart of the polymer obtained in Example 2.
Figure 6:
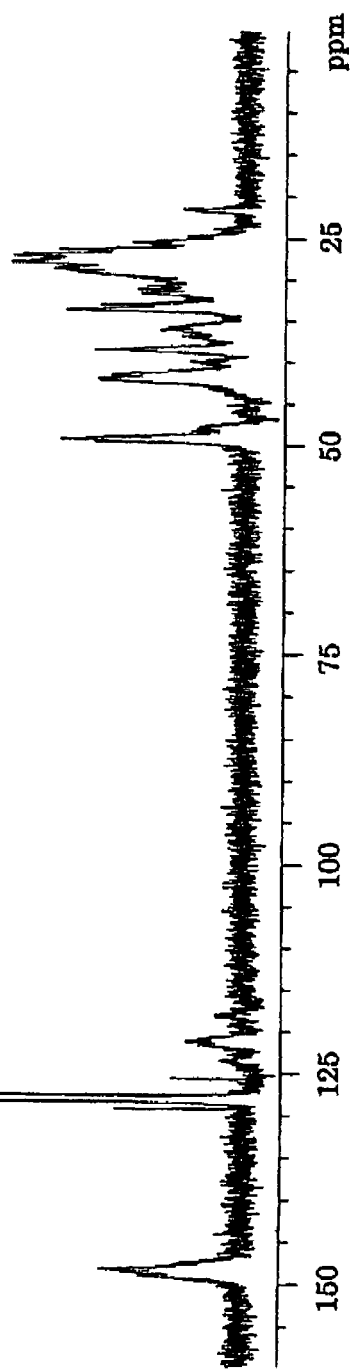
FIG. 6 is a ¹³CNMR (100 MHz) chart of the polymer obtained in Example 2.

Into a flask purged with nitrogen were fed 25 ml of methylene chloride and 5 ml of the conjugated tetrahydroindene obtained in the above Production Example 1. Stirring was made with the flask-inside temperature being kept at −40° C. Into the system was dropwise added 0.25 ml of a solution of 0.1 ml of BF$_3$-ether complex (BF$_3$ content: 47%) dissolved in 10 ml of methylene chloride, followed by stirring for 60 minutes. 50 ml of toluene was added to make a uniform solution. The solution was poured into 350 ml of methanol. The resulting white solid was recovered by filtration under reduced pressure and vacuum-dried at 130° C. to obtain 1.5 g of a white solid. The solid had good solubility in toluene and, when measured for molecular weight by GPC, gave an Mw of 31,800 and an Mn of 12,100. Also, the solid showed a Tg of 169° C. The $^1$HNMR and $^{13}$CNMR of the polymer obtained are shown in FIG. 5 and FIG. 6, respectively.

Example 3

Into a flask purged with nitrogen were fed 25 ml of methylene chloride and 5 ml of the conjugated tetrahydroindene obtained in the above Production Example 1. Stirring was made with the flask-inside temperature being kept at 0° C. Into the system was dropwise added a solution of 106 mg of tris(pentafluorophenyl)borane dissolved in 0.5 ml of methylene chloride, followed by stirring for 3 minutes. 50 ml of toluene was added to make a uniform solution. The solution was poured into 350 ml of methanol. The resulting white solid was recovered by filtration under reduced pressure and vacuum-dried at 130° C. to obtain 4.1 g of a white solid. The solid had good solubility in toluene and, when measured for molecular weight by GPC, gave an Mw of 39,600 and an Mn of 11,400. Also, the solid showed a Tg of 166° C.

Example 4

Into a flask purged with nitrogen were fed 25 ml of methylene chloride and 5 ml of the conjugated tetrahydroindene obtained in the above Production Example 1. Stirring was made with the flask-inside temperature being kept at −60° C. Into the system was dropwise added a solution of 109 mg of tris(pentafluorophenyl)borane dissolved in 0.5 ml of methylene chloride, followed by stirring for 6 minutes. 120 ml of toluene was added to make a uniform solution. The solution was poured into 500 ml of methanol. The resulting white solid was recovered by filtration under reduced pressure and vacuum-dried at 130° C. to obtain 3.2 g of a white solid. The solid had good solubility in toluene and, when measured for molecular weight by GPC, gave an Mw of 78,800 and an Mn of 36,000. Also, the solid showed a Tg of 167° C.

Example 5

Figure 7:
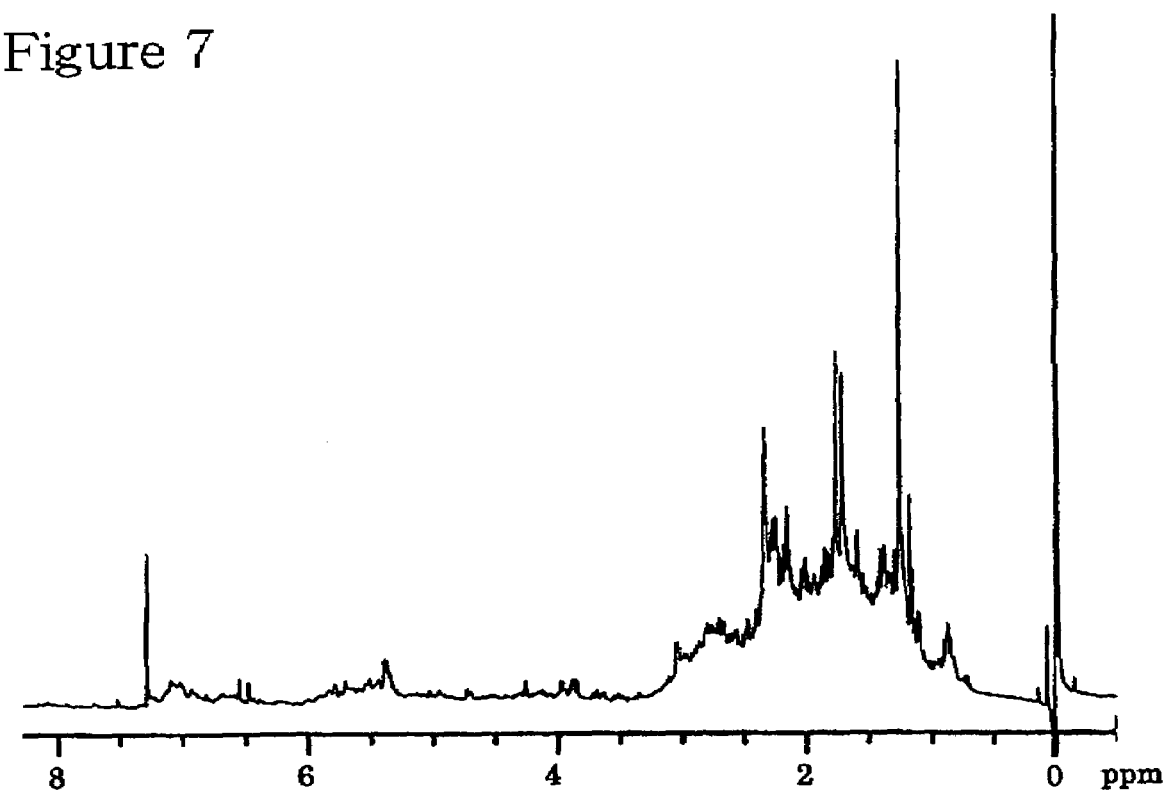
FIG. 7 is a ¹HNMR (400 MHz) chart of the polymer obtained in Example 5.
Figure 8:
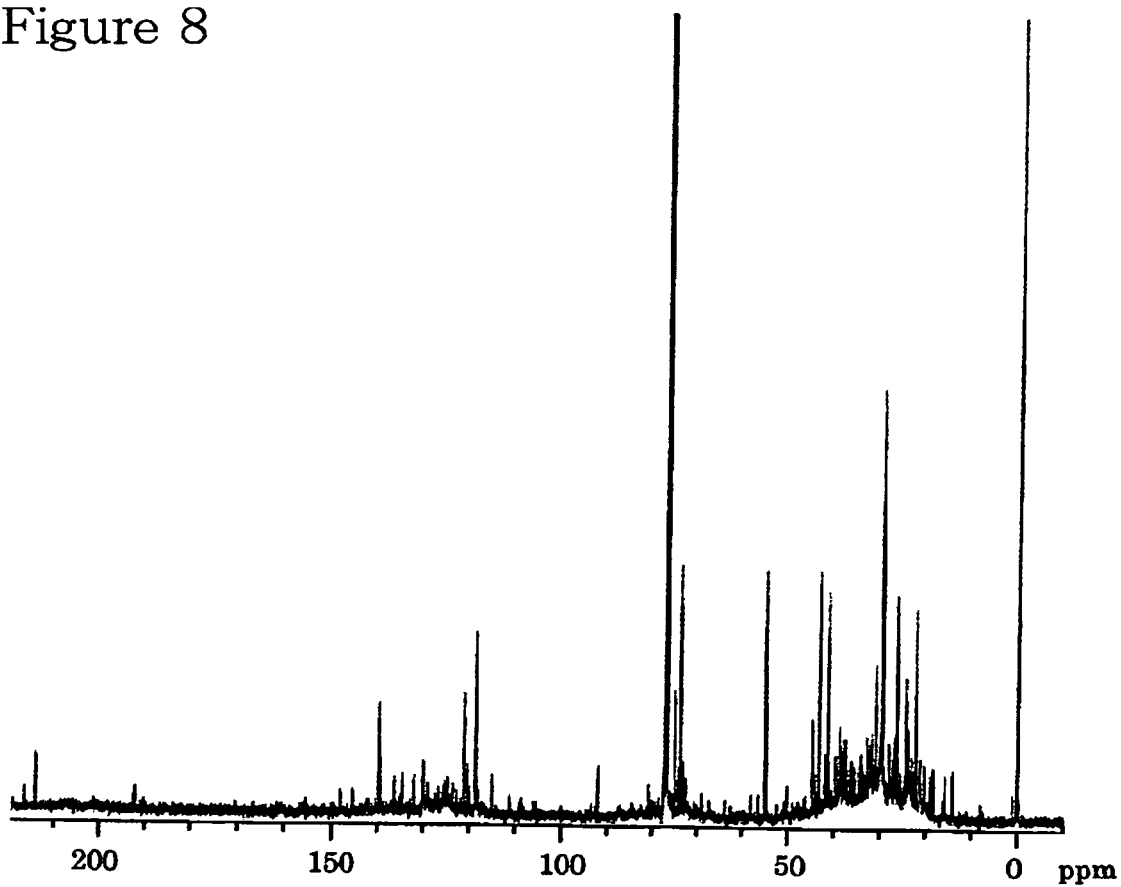
FIG. 8 is a ¹³CNMR (100 MHz) chart of the polymer obtained in Example 5.

Into a flask purged with nitrogen were fed 10 ml of methylene chloride and 2.35 g of the conjugated methyltetrahydroindene obtained in the above Production Example 2. Stirring was made with the flask-inside temperature being kept at 0° C. Into the system was dropwise added a solution of 130 mg of tris(pentafluorophenyl)borane dissolved in 2 ml of methylene chloride, followed by stirring for 20 minutes. 1 ml of methanol was added. The reaction mixture was filtrated under reduced pressure using a filter paper and the filtrate was washed with toluene. The filtrate was then subjected to distillation under reduced pressure to remove the solvent, and the residue was vacuum dried at 30° C. to obtain a yellow, transparent, viscous liquid. The liquid had good solubility in toluene and, when measured for molecular weight by GPC, gave an Mw of 571 and an Mn of 318. The $^1$HNMR and $^{13}$CNMR of the liquid are shown in FIG. 7 and FIG. 8, respectively.

Example 6

The following Example 6 is a synthesis example of bicyclic conjugated diene polymer by anionic polymerization.

Into a flask purged with nitrogen were fed 20 ml of tetrahydrofuran, 2.3 ml of n-butyl lithium (a 1.6 M hexane solution) and 0.7 ml of tetramethylethylenediamine. The mixture was stirred for 5 minutes. To the mixture was dropwise added 5 ml of the conjugated tetrahydroindene obtained in the above Production Example 1, followed by stirring at room temperature for 3 hours. The resulting solution was poured into 500 ml of methanol. The resulting white solid was recovered by filtration under reduced pressure and vacuum-dried at 100° C. to obtain 1.8 g of a white solid. The solid had good solubility in toluene and, when measured for molecular weight by GPC, gave an Mw of 1,300 and an Mn of 1,000. Also, the solid showed a Tg of 98° C.

Example 7

The following Example 7 is a synthesis example of bicyclic conjugated diene polymer by radical polymerization.

Figure 9:
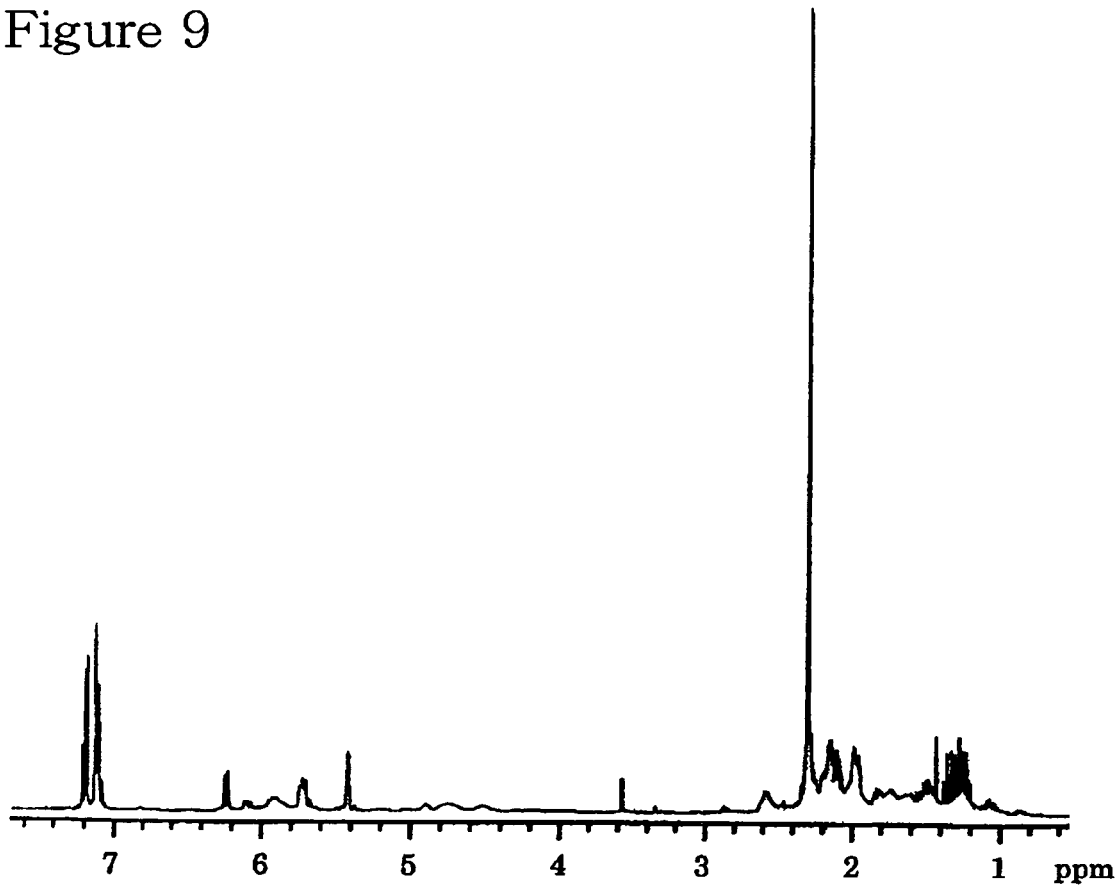
FIG. 9 is a ¹HNMR (400 MHz) chart of the polymer obtained in Example 7.
Figure 10:
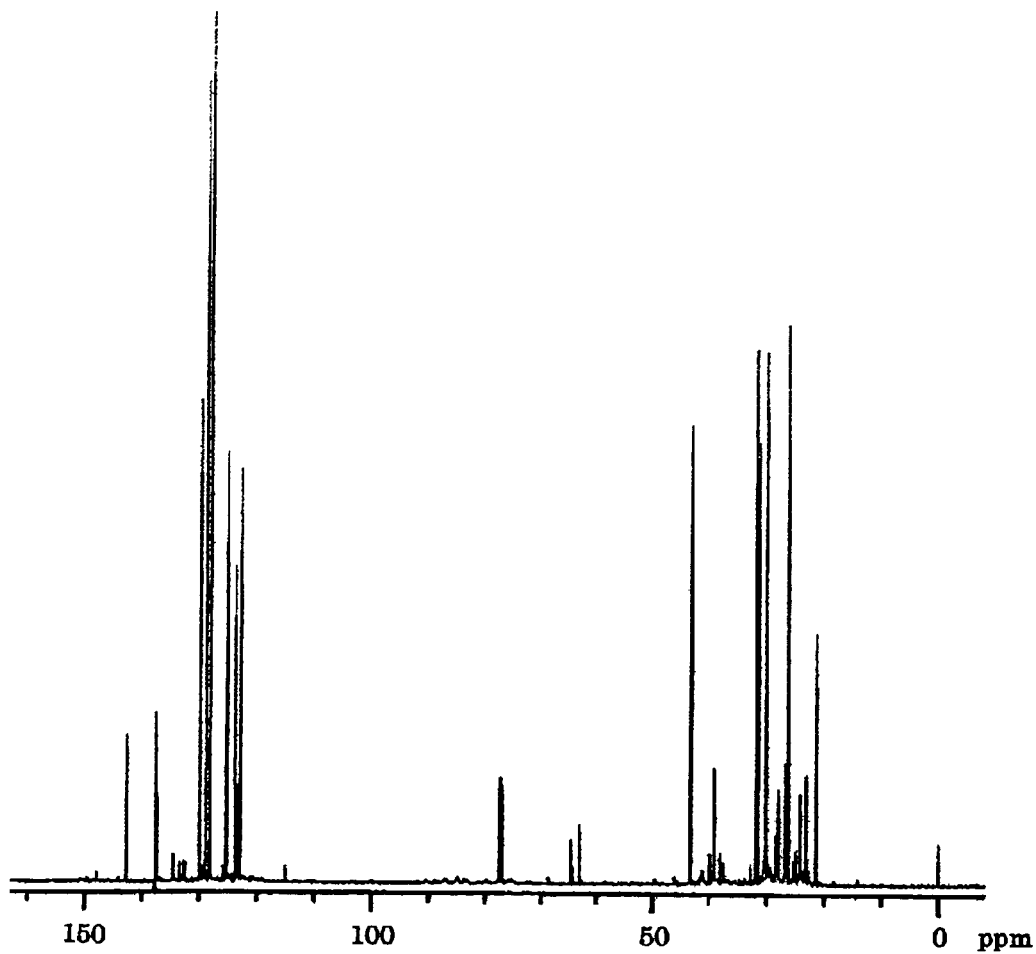
FIG. 10 is a ¹³CNMR (100 MHz) chart of the polymer obtained in Example 7.
Figure 11:
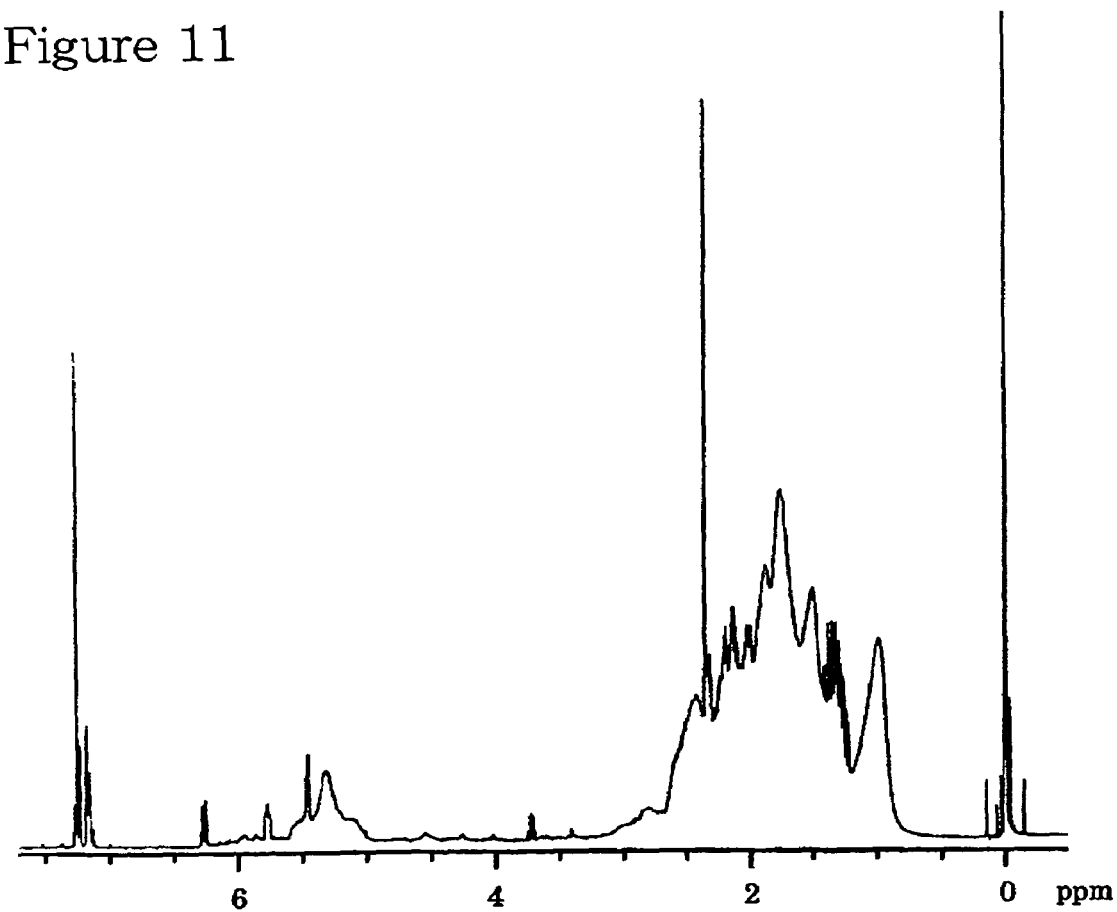
FIG. 11 is a ¹HNMR (400 MHz) chart of the polymer obtained in Example 8.
Figure 12:
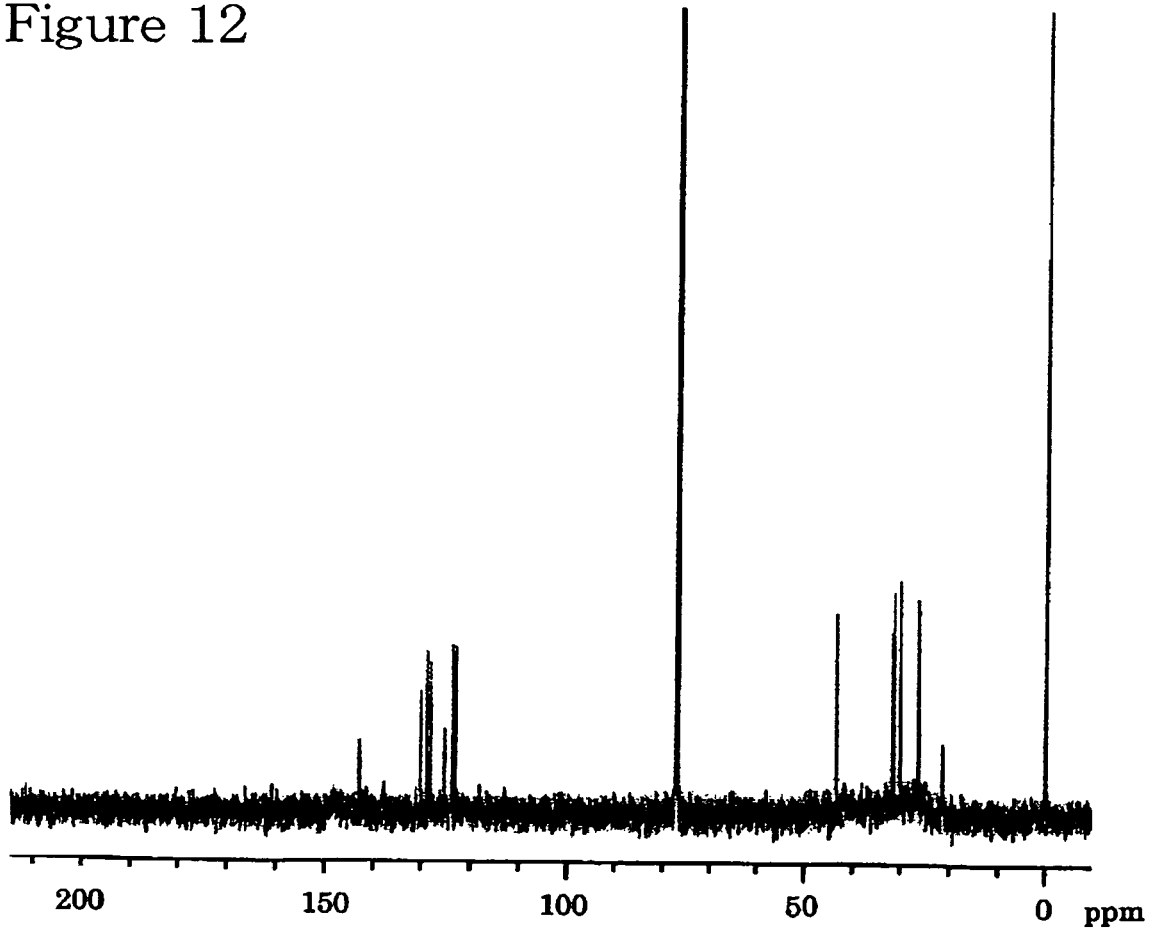
FIG. 12 is a ¹³CNMR (100 MHz) chart of the polymer obtained in Example 8.

In a three-necked eggplant-shaped flask with a Dimroth condenser were placed 4.12 g of the conjugated tetrahydroindene obtained in the above Production Example 1, 0.18 g of 2,2'-azobisisobutyronitrle and 30 ml of toluene. Bubbling with argon was conducted for 1 hour. Then, the flask inside was heated to 90° C. in an argon current, using an oil bath, to give rise to a reaction. The reaction was completed in 3 hours. The reaction mixture was subjected to distillation under reduced pressure to distil off the light fractions. The residue was vacuum-dried at 30° C. to obtain a yellow, transparent, viscous liquid. The liquid was measured by NMR. The $^1$HNMR chart and $^{13}$CNMR chart of the liquid are shown in FIG. 9 and FIG. 10, respectively. The liquid was also measured for molecular weight by GPC, which indicated a Mw of 569 and an Mn of 523.

Example 8

The following Example 8 is a synthesis example of bicyclic conjugated diene polymer by coordination polymerization.

In a two-necked eggplant-shaped flask dried with N$_2$ was placed, in an N$_2$ atmosphere, an ethylenebis(indenyl) zirconium (IV) dichloride/toluene solution (2.4 mg/20 ml). Then, 2.0 ml of a toluene solution of 10% of methylaluminoxane was placed (the color of solution changed from yellow to orange). Thereafter, 9 ml of the conjugated tetrahydroindene obtained in the above Production Example 1 was added. Stirring was made for 4 hours and ethanol was added for quenching. Ethanol was further added and a white precipitate appeared. The precipitate was collected by filtration under reduced pressure, washed with ethanol, and vacuum-dried at 40° C. to obtain 1.5 g of a solid. The solid showed a Tg of 141° C.

The polymers obtained in the above Examples 1 to 8 are each a bicyclic conjugated diene polymer having a structure not reported heretofore and can be used in wide applications such as optical material, electronic material, medical instrument, adhesive, lubricant and the like. Having a bicyclic structure, they are expected to show high mechanical strengths. In particular, the polymers obtained in Examples 2 to 4 show a high Tg and have high heat resistance.

The following Examples 9 and 10 are each a synthesis example of a bicyclic conjugated diene copolymer according to the second aspect of the present invention.

In addition to the measuring apparatuses used in the above Examples 1 to 8, FT-730 produced by HORIBA, Ltd. was used for measurement of infrared absorption spectrum (IR).

Example 9

Figure 13:
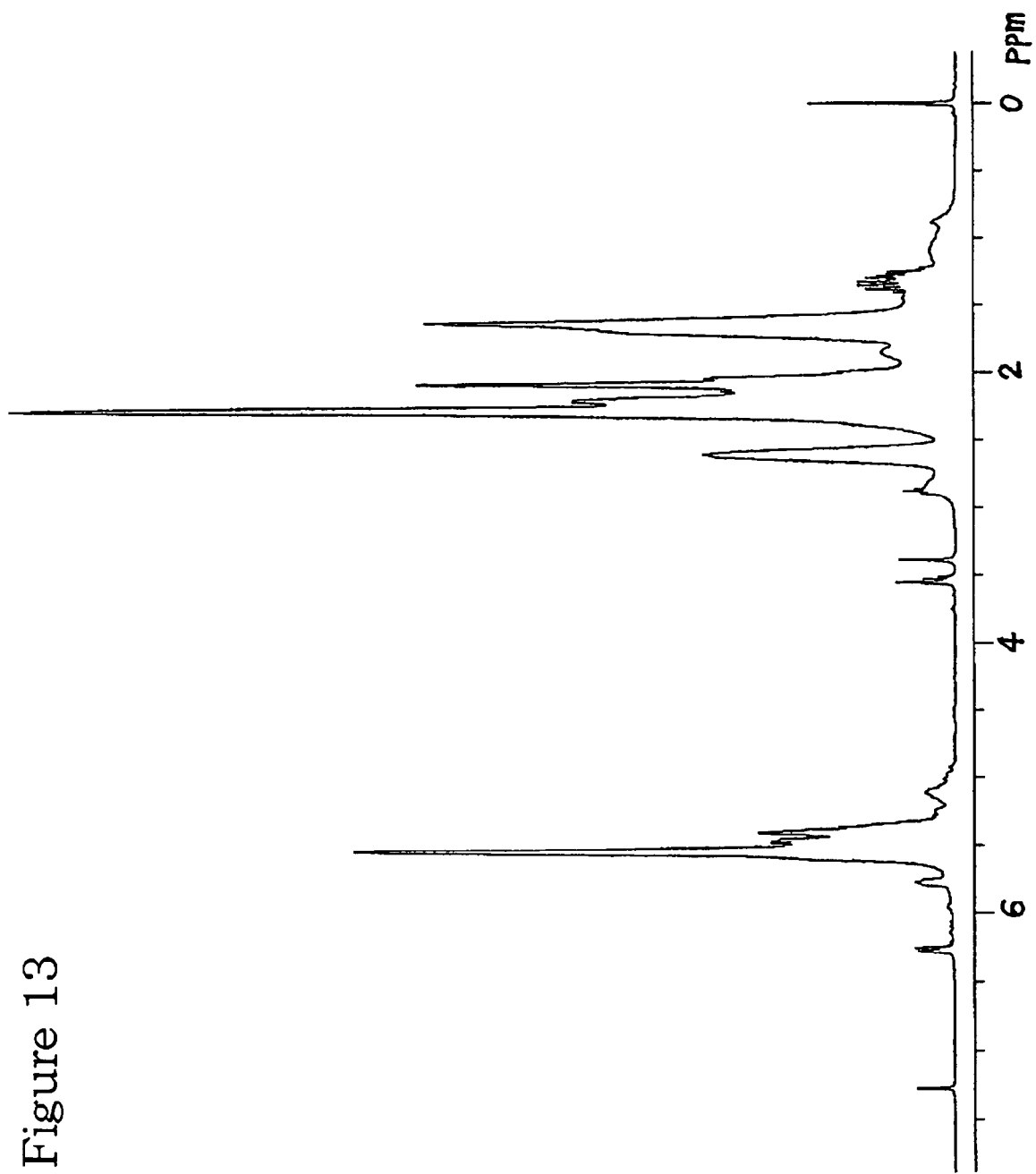
FIG. 13 is a ¹HNMR (400 MHz) chart of the polymer obtained in Example 9.
Figure 14:
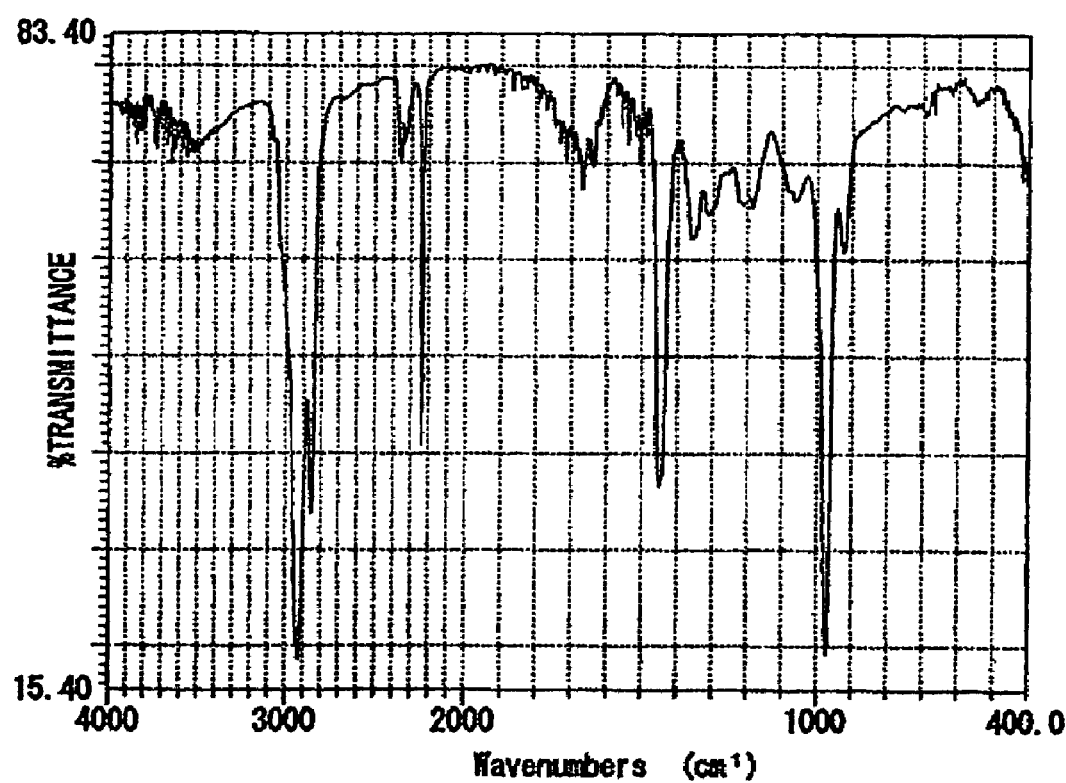
FIG. 14 is an IR chart of the copolymer obtained in Example 9.

Into a 200-ml autoclave were fed 95 ml of water, 0.016 g of tetrasodium ethylenediaminetetraacetic acetate hydrate, 0.05 g of sodium carbonate, 0.2 g of tert-dodecylmercaptan, 0.0025 g of ferrous sulfate heptahydrate, 0.025 g of Rongalit, 0.25 g of Demol N (produced by Kao Corporation), 1.0 g of sodium 1-octanesulfonate, 5.0 g of the conjugated tetrahydroindene obtained in the above Production Example 1 and 19 ml of acrylonitrile. The inside of the autoclave was purged with $N_2$ sufficiently. Subsequently, 45 ml of 1,3-butadiene was introduced. After the mixture was cooled to 5° C., a solution of p-methane hydroperoxide (0.06 g)/acrylonitrile (1 ml) was introduced, and further 1 ml of acrylonitrile for cleaning was introduced. After the reaction was allowed to take place for 7 hours, then, 1.7 g of an aqueous solution containing 10% of sodium dimethyldithiocarbamate was added. To the reaction mixture was added a 25% aqueous sodium chloride solution to give rise to salting-out. The resulting precipitate was collected by filtration and vacuum-dried with heating, to obtain a slightly yellow rubbery substance. The $^1$HNMR chart and IR chart of the rubbery substance were shown in FIG. 13 and FIG. 14, respectively. Broad peaks derived from the conjugated tetrahydroindene were confirmed at 1.2 ppm and 1.8 ppm of $^1$HNMR. A peak derived from the conjugated tetrahydroindene was confirmed in the vicinity of 1,700 $cm^{-1}$ of IR.

Example 10

Figure 15:
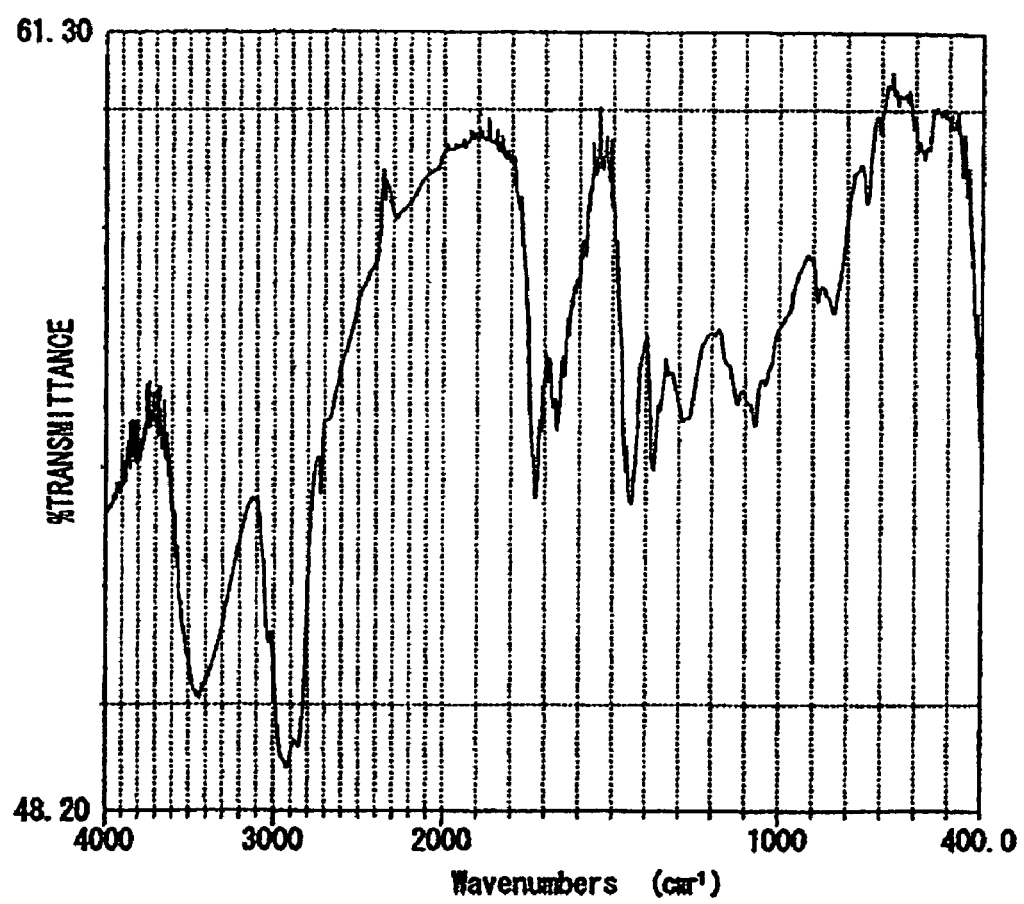
FIG. 15 is an IR chart of the copolymer obtained in Example 10.

Into a dried three-necked eggplant-shaped flask with a reflux condenser were fed, using a syringe in an $N_2$ atmosphere, 10 ml of heptane, a hexane solution containing about 15% (0.0025 mol) of triisobutyl aluminum, and a toluene solution containing 1.0 M titanium (IV) chloride (0.025 mol) in this order (the resulting mixture became a black suspension). Then, there was added a conjugated tetrahydroindene (2.6 ml) (obtained in the above Production Example 1)/isoprene (8 ml)/hexane (40 ml) solution. The mixture was stirred for 5 hours in an oil bath of 35° C. to give rise to a reaction. After the completion of the reaction, toluene was added to dissolve the precipitate formed in the reaction. An aqueous hydrochloric acid solution was added for layer separation. Methanol was added to the organic layer for reprecipitation. The resulting precipitate was vacuum-dried to obtain a light yellow, viscous solid. The IR char of the solid is shown in FIG. 15. Peaks derived from isoprene were confirmed at 1,400 $cm^{-1}$ and 1,660 $cm^{-1}$ and peaks derived from the conjugated tetrahydroindene were confirmed at 1,700 $cm^{-1}$ and 3,400 $cm^{-1}$.

INDUSTRIAL APPLICABILITY

As described above, the cyclic diene polymer according to the first aspect of the present invention is produced from a cyclic diene monomer easy to produce and having a high polymerization activity, additionally has good solubility in solvents, and shows high heat resistance and high mechanical strengths.

The cyclic diene copolymer according to the second aspect of the present invention is produced from a bicyclic conjugated diene monomer easy to produce and having a high polymerization activity, hardly gives rise to gelling, is uniform and has good solubility, and can be allowed to have various functions.

The invention claimed is:

1. A bicyclic conjugated diene polymer obtained by polymerizing a monomer comprising at least one kind of bicyclic conjugated diene monomer represented by the following general formula (I):

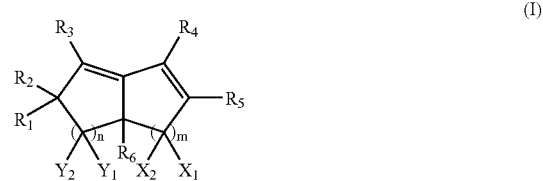

wherein in the above general formula (I), $R_1$, $R_2$, $R_3$, $R_4$, $R_5$ and $R_6$ may be the same or different from each other and are each a hydrogen atom, a halogen atom, or an alkyl or halogenated alkyl group of 1 to 20 carbon atoms; n and m are each an integer of from 0 to 10; $X_1$, $X_2$, $Y_1$ and $Y_2$ may be the same or different from each other and are each a hydrogen atom, a halogen atom, or an alkyl or halogenated alkyl group of 1 to 20 carbon atoms; and, when m or n is 2 or more, each of $mX_1$'s, $mX_2$'s, $nY_1$'s and $nY_2$'s may be the same or different from each other.

2. A bicyclic conjugated diene polymer according to claim 1, wherein the bicyclic conjugated diene monomer comprises bicyclo[4.3.0]-2,9-nonadiene represented by $R_1=R_2=R_3=R_4=R_5=R_6=H$, n=2, m=1, and $X_1=X_2=Y_1=Y_2=H$ in the general formula (I).

3. A bicyclic conjugated diene polymer according to claim 1, wherein the bicyclic conjugated diene monomer comprises bicyclo[4.3.0]-2,9-nonadiene represented by $R_1=R_2=R_3=R_4=R_5=R_6=H$, n=2, m=1, and $X_1=X_2=Y_1=Y_2=H$ in the general formula (I) and bicyclo[4.3.0]-1,8-nonadiene represented by $R_1=R_2=R_3=R_4=R_5=R_6=H$, n=1, m=2, and $X_1=X_2=Y_1=Y_2=H$ in the general formula (I).

4. A bicyclic conjugated diene polymer according to claim 2, wherein the bicyclic conjugated diene monomer is a part or the whole of the isomerization products of bicyclo-[4.3.0]-3,7-nonadiene.

5. A bicyclic conjugated diene polymer according to claim 1, wherein the bicyclic conjugated diene monomer comprises bicyclo[4.3.0]-3-methyl-2,9-nonadiene represented by $R_1=R_2=R_3=R_4=R_6=H$, $R_5=CH_3$, n=1, m=2, and $X_1=X_2=Y_1=Y_2=H$ in the general formula (I).

6. A bicyclic conjugated diene polymer according to claim 1, wherein the bicyclic conjugated diene monomer comprises bicyclo[4.3.0]-3-methyl-2,9-nonadiene and bicyclo[4.3.0]-3-methyl-1,3-nonadiene represented by $R_1=R_2=R_3=R_4=R_6=H$, $R_5=CH_3$, n=1, m=2, and $X_1=X_2=Y_1=Y_2=H$ in the general formula (I).

7. A bicyclic conjugated diene polymer according to claim 5, wherein the bicyclic conjugated diene monomer is a part or the whole of the isomerization products of bicyclo-[4.3.0]-3-methyl-3,7-nonadiene.

8. A modified bicyclic conjugated diene polymer obtained by chemical conversion of the bicyclic conjugated diene polymer set forth in claim 1.

9. A bicyclic conjugated diene copolymer obtained by copolymerizing a monomer comprising at least one kind of bicyclic conjugated diene monomer represented by the following general formula (I), with at least one kind of unsaturated compound other than said monomer:

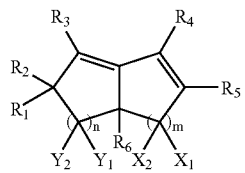

(I)

wherein in the above general formula (I), $R_1$, $R_2$, $R_3$, $R_4$, $R_5$ and $R_6$ may be the same or different from each other and are each a hydrogen atom, a halogen atom, or an alkyl or halogenated alkyl group of 1 to 20 carbon atoms; n and m are each an integer of from 0 to 10; $X_1$, $X_2$, $Y_1$ and $Y_2$ may be the same or different from each other and are each a hydrogen atom, a halogen atom, or an alkyl or halogenated alkyl group of 1 to 20 carbon atoms; and, when m or n is 2 or more, each of $mX_1$'s, $mX_2$'s, $nY_1$'s and $nY_2$'s may be the same or different from each other.

10. A bicyclic conjugated diene copolymer according to claim 9, wherein the bicyclic conjugated diene monomer comprises bicyclo[4.3.0]-2,9-nonadiene represented by $R_1=R_2=R_3=R_4=R_5=R_6=H$, n=2, m=1, and $X_1=X_2=Y_1=Y_2=H$ in the general formula (I).

11. A bicyclic conjugated diene copolymer according to claim 9, wherein the bicyclic conjugated diene monomer comprises bicyclo[4.3.0]-2,9-nonadiene represented by $R_1=R_2=R_3=R_4=R_5=R_6=H$, n=2, m=1, and $X_1=X_2=Y_1=Y_2=H$ in the general formula (I) and bicyclo[4.3.0]-1,8-nonadiene represented by $R_1=R_2=R_3=R_4=R_5=\mu R_6=H$, n=1, m=2, and $X_1=X_2=Y_1=Y_2=H$ in the general formula (I).

12. A bicyclic conjugated diene copolymer according to claim 10, wherein the bicyclic conjugated diene monomer is a part or the whole of the isomerization products of bicyclo-[4.3.0]-3,7-nonadiene.

13. A bicyclic conjugated diene copolymer according to claim 9, wherein the unsaturated compound is at least one kind selected from olefins and diolefins all of 2 to 10 carbon atoms.

14. A bicyclic conjugated diene copolymer according to claim 13, wherein the unsaturated compound is at least one kind selected from butadiene, isoprene, piperylene, chloroprene, acrylonitrile, ethylene, propylene, isobutene and styrene.

15. A modified bicyclic conjugated diene copolymer obtained by chemical conversion of a bicyclic conjugated diene copolymer set forth in claim 9.

* * * * *

UNITED STATES PATENT AND TRADEMARK OFFICE
CERTIFICATE OF CORRECTION

| | | |
|---|---|---|
| PATENT NO. | : 7,034,095 B2 | Page 1 of 1 |
| APPLICATION NO. | : 10/504550 | |
| DATED | : April 25, 2006 | |
| INVENTOR(S) | : Saisuke Watanabe, Teppei Tsujimoto and Shuichi Tajima | |

It is certified that error appears in the above-identified patent and that said Letters Patent is hereby corrected as shown below:

Cover page, item (30) Foreign Application Priority Data, "Oct. 20, 2002" should be --Oct. 31. 2002--.

Signed and Sealed this

Fifth Day of December, 2006

JON W. DUDAS
*Director of the United States Patent and Trademark Office*